(12) United States Patent
Stiehl et al.

(10) Patent No.: US 8,208,978 B2
(45) Date of Patent: Jun. 26, 2012

(54) SMALL LANYARD CONNECTOR FOR LOW PROFILE DEVICE

(75) Inventors: Kurt Stiehl, San Jose, CA (US); Karen Cheng, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 310 days.

(21) Appl. No.: 12/535,567

(22) Filed: Aug. 4, 2009

(65) Prior Publication Data

US 2009/0290296 A1    Nov. 26, 2009

Related U.S. Application Data

(62) Division of application No. 12/055,233, filed on Mar. 25, 2008, now abandoned.

(51) Int. Cl.
*H04M 1/00* (2006.01)
*H04B 1/08* (2006.01)
*H05K 5/00* (2006.01)
*A45F 3/04* (2006.01)

(52) U.S. Cl. .............. 455/575.2; 455/575.1; 455/575.6; 455/347; 455/351; 361/679.01; 381/309; 224/255; 379/428.01

(58) Field of Classification Search .............. 455/575.1, 455/575.6, 347; 312/7.1, 8.4; 361/679.01, 361/679.03; 381/309, 311, 312, 370, 374–381; 379/428.01, 428.02, 428.04, 430, 433.05; 224/255, 257, 576
See application file for complete search history.

(56) References Cited

U.S. PATENT DOCUMENTS

| 3,117,484 A | 1/1964 | Myers |
| 3,233,496 A | 2/1966 | De Pew et al. |
| 4,404,714 A | 9/1983 | Duran |
| 4,649,570 A | 3/1987 | Terbrack et al. |
| 5,194,987 A | 3/1993 | Moore et al. |
| D338,037 S | 8/1993 | Miller et al. |
| D342,449 S | 12/1993 | Mattheis |
| 5,640,459 A | 6/1997 | Hedeen |

(Continued)

FOREIGN PATENT DOCUMENTS

DE          20020096          2/2001

(Continued)

OTHER PUBLICATIONS

Office Action dated Jul. 24, 2009 in U.S. Appl. No. 11/212,514.

(Continued)

*Primary Examiner* — Kamran Afshar
*Assistant Examiner* — Gerald Oliver
(74) *Attorney, Agent, or Firm* — Beyer Law Group LLP

(57) ABSTRACT

A miniaturized attachment mechanism for attaching a lanyard to a cell phone, MP3 player or other portable device having a hole in its outer casing is disclosed. The miniaturized attachment mechanism can have one end permanently fastened to a lanyard, and can include a spring-loaded ball detent within a hollow shaft. The hollow shaft diameter can be about 3 millimeters or less, while the diameter of the ball within the hollow shaft can be about 2 millimeters or less. The hollow shaft can be inserted into the casing hole such that the ball detent secures the mechanism to the casing until a pin release is used. In another embodiment, the miniaturized attachment mechanism can include a 1 millimeter shaft having a groove at an insertable end, while the casing encloses a two hole E-ring mechanism adapted to lock onto the groove when the shaft is inserted into the casing hole.

14 Claims, 7 Drawing Sheets

U.S. PATENT DOCUMENTS

| | | | |
|---|---|---|---|
| D437,485 S | 2/2001 | Hicks et al. | |
| D462,523 S | 9/2002 | Kalbach | |
| D462,689 S | 9/2002 | Moran | |
| D467,416 S | 12/2002 | Kalbach | |
| 6,550,108 B2 | 4/2003 | Pratl | |
| 6,675,446 B2 | 1/2004 | Buettell | |
| 6,711,785 B1 | 3/2004 | Hicks et al. | |
| 6,776,317 B1 | 8/2004 | Parker | |
| D500,302 S | 12/2004 | Deguchi | |
| D500,485 S | 1/2005 | Deguchi | |
| 6,871,732 B2 | 3/2005 | Flint et al. | |
| D527,723 S | 9/2006 | Andre et al. | |
| D529,044 S | 9/2006 | Andre et al. | |
| D530,340 S | 10/2006 | Andre et al. | |
| D534,065 S | 12/2006 | Andre et al. | |
| D534,921 S | 1/2007 | Andre et al. | |
| D562,807 S | 2/2008 | Andre et al. | |
| 7,340,221 B2 | 3/2008 | Wikel et al. | |
| D566,691 S | 4/2008 | Andre et al. | |
| 7,780,047 B2 * | 8/2010 | Chen et al. | 224/218 |
| 7,861,991 B1 * | 1/2011 | Sylvertooth-Jackson | 248/274.1 |
| 7,936,557 B2 * | 5/2011 | Kobayashi | 361/679.01 |
| 2002/0090099 A1 | 7/2002 | Hwang | |
| 2006/0009069 A1 * | 1/2006 | Zoller | 439/501 |
| 2007/0053523 A1 * | 3/2007 | Iuliis et al. | 381/77 |
| 2009/0143116 A1 * | 6/2009 | Harmon et al. | 455/575.6 |

FOREIGN PATENT DOCUMENTS

| | | |
|---|---|---|
| EP | 1379058 | 1/2004 |
| EP | 1361502 | 1/2009 |
| JP | D1085073 | 9/2000 |
| JP | D1085080 | 9/2000 |
| JP | D1089527 | 10/2000 |
| JP | D1089528 | 10/2000 |
| JP | D1089529 | 10/2000 |
| JP | D1105429 | 4/2001 |
| JP | D1106452 | 4/2001 |
| JP | D1121650 | 9/2001 |
| JP | D1123108 | 10/2001 |
| JP | D1129386 | 12/2001 |
| JP | D1129387 | 12/2001 |
| JP | D1106151 | 8/2002 |
| JP | D1089530 | 10/2002 |
| JP | D1131037 | 10/2002 |
| JP | D1154927 | 10/2002 |
| JP | D1174623 | 6/2003 |
| JP | D1174710 | 6/2003 |
| JP | D1185408 | 9/2003 |
| JP | D1188267 | 10/2003 |
| JP | D1191223 | 12/2003 |
| JP | D1193941 | 1/2004 |
| JP | D1211811 | 7/2004 |
| JP | D1211812 | 7/2004 |
| WO | 03103255 | 12/2003 |

OTHER PUBLICATIONS

Office Action dated Feb. 25, 2009 in U.S. Appl. No. 11/212,514.
U.S. Appl. No. 29/237,287 entitled "Electronic Device Holder" filed Aug. 24, 2005.
"ICE Bud: Lanyard Headphones for iPod® nano and shuffle", www.macally.com/spec.ipod/icebud.html, downloaded Nov. 10, 2005.
"ASCII" weekly publication issued on Jul. 29, 2003, No. 450, Design of USB Memory Audio Player (JPO publicly known Design No. HA15013509) received by the National Center for Industrial Property Information on Jul. 15, 2003.
"Crucial Gizmo! Hi-Speed 512MB USB Flash Drive", Xtreme Resources:: Your Xtreme Hardware Review and News Zone!, www.xtremeresources.com, downloaded Nov. 23, 2005.
"USB Flash Drive—Style DE (Best Seller)", www.memorysuppliers.com/usbfldrstde.html, downloaded Nov. 23, 2005.
"Iomega Mini USB Drives", www.iomega.com, downloaded Nov. 23, 2005.
"Verbatim USB Drive Review: Store 'n' Go 512MB", www.audioholics.com, downloaded Nov. 23, 2005.
Gigabyte GO-U0128B 128MB USB Hard Drive Review—Pcstats.com, www.pcstats.com, downloaded Nov. 23, 2005.
"Lexar Media JumpDrive Classic USB Flash Drive with Lanyards, 128MB, 3 Pack", www.compusa.com, downloaded Nov. 23, 2005.
"USB Drive, USB Pen Drive, USB Flash Drive, USB Thumb Drive, Flash Drives, 512MB, 1GB, 2GB, 4GB, 8GB", www.supermediastore.com/usb-flashdrive-usb-flash-drives.html, downloaded Nov. 23, 2005.
"USB Drive, USB Pen Drive, USB Flash Drive, USB Thumb Drive, Flash Drives, 512MB, 1GB, 2GB, 4GB, 8GB", www.supermediastore.com/usb-flash-drive-usb-flash-drives-pen-drives.html, downloaded Nov. 23, 2005.
"USB Drive, USB Pen Drive, USB Flash Drive, USB Thumb Drive, Flash Drives, 512MB, 1GB, 2GB, 4GB, 8GB", www.supermediastore.com/usb-flash-drive-usb-flash-drives-pen-drives.html..., downloaded Nov. 23, 2005.
"USB Flash Drives, USB Pen Drives, Portable Memory, Shop for USB Flash Drives" www.flash-memory-store.com..., downloaded Nov. 23, 2005.
"Sony MicroVault 512MB USB 2.0 Flash Drive (00027242645561): Overview", www.dealtime.com..., downloaded Nov. 23, 2005.
"Philips KEY006 128MB MP3/WMA player/Thumb Drive with Neck Strap Remote", www.amazon.com..., downloaded Nov. 22, 2005.
Joybee 125 MP3 Player, 128MB, Orange (DA125-128MB-Orange), www.amazon.com..., downloaded Nov. 22, 2005.
"NEO PIX Live 256 Mb MP3 USB 2.0 USB key", www.pixmania.co.uk... downloaded Nov. 22, 2005.
"iRiver 1GBMP3 Player with FM Tuner", www.circuitcity.com..., downloaded Nov. 22, 2005.
"Sony Network Walkman Digital Music Player", www.circuitcity.com..., downloaded Nov. 22, 2005.
"Samsung 1GB USB Direct-Insert MP3 Player", www.circuitcity.com..., downloaded Nov. 22, 2005.
"Samsung 512MB Portable Digital Audio Player", www.circuitcity.com..., downloaded Nov. 22, 2005.
"iRiver 512MB MP3 Jukebox with Color Display", www.circuitcity.com..., downloaded Nov. 22, 2005.
"Samsung 512MB USB Direct-Insert MP3 Player", www.circuitcity.com..., downloaded Nov. 22, 2005.
"Creative Zen Nano 512MB MP3 Player (White)", www.circuitcity.com..., downloaded Nov. 22, 2005.
"SanDisk 512MB MP3 Player", www.circuitcity.com..., downloaded Nov. 22, 2005.
"YoYo-128MB", www.usb-mp3player.co.uk, downloaded Nov. 22, 2005.
"Aigo BY06-128MB", www.usb-mp3players.co.uk, downloaded Nov. 22, 2005.
"Sigmatel USB Mp3 Player", www.intomusic.co.uk/scipts/usb-mp3-wma-player.asp, downloaded Nov. 22, 2005.
"Transcend 256MB T. Sonic 610 USB MP3 Player", www.supermediastore.com..., downloaded Nov. 22, 2005.
"Apacer Audio Steno AS820 USB 512MB Flash Drive MP3 Player FM Radio Line-In MP3 Conversion Voice", www.supermidastore.com..., downloaded Nov. 22, 2005.
"Ennyah Digi Sound 701 Aluminum Case MP3 Player 212MB Silver", www.supermediastore.com..., downloaded Nov. 22, 2005.
"Artwizz HangPhones Earphones", http://shop.ipodworld.co.uk..., downloaded Jun. 27, 2005.
"Rio eStore", www.riohome.net/shop/bin... downloaded Jun. 15, 2005.
"PN10 512MB", www.iriveramerica.com..., downloaded Aug. 23, 2005.
"iDiddy", www.iddidy.com downloaded Aug. 24, 2005.
International Search Report dated Apr. 24, 2007 for International Application No. PCT/US2006/033186.
Written Opinion dated Apr. 24, 2007 for International Application No. PCT/US2006/033186.

* cited by examiner

FIG. 6A  FIG. 6B

SMALL LANYARD CONNECTOR FOR LOW PROFILE DEVICE

NOTICE OF RELATED CASE

This application is a divisional of and claims priority from co-pending U.S. patent application Ser. No. 12/055,233, filed Mar. 25, 2008 and entitled, "SMALL LANYARD CONNECTOR FOR LOW PROFILE DEVICE," which is incorporated by reference herein for all purposes.

TECHNICAL FIELD

The present invention relates generally to miniaturized connectors, and more particularly to the use of miniaturized connectors adapted to hold lanyards, straps or other similar items to portable or other low profile devices.

BACKGROUND

Cameras, media players, cellular telephones and other low profile or personal portable devices can often be used with various accessories. Such accessories can include a lanyard, strap, cord, or other similar item that can be used to hold, secure or even wear the low profile or portable device. Such arrangements can be convenient and/or even fashionable for a user. As one example, a camera hanging on a strap around the neck of a user allows the user to have his or her hands free for various other needs when not using the camera. As another example, many users of media players, such as the iPod® media player made by Apple Inc., like to wear these items by way of straps or lanyards for both convenience and fashion purposes.

In many instances, the portable or low profile device may have a bar, loop, or other similar feature built into its housing for use with such a lanyard, strap, cord or other suitable attaching item. The lanyard or strap can be slipped around or through this bar or loop, and then looped or tied back onto itself as a way of fastening the lanyard or strap to the portable device. In fact, many commercially available personal cameras are sold with such a feature and associated strap.

Although often effective, such loop and strap arrangements can sometimes be cumbersome. In fact, where the strap, lanyard and/or portable device to which it is to be attached get smaller, the difficulty and annoyance factors tend to rise in tying and untying the lanyard or strap in this type of attachment arrangement. These types of arrangements are not always the most aesthetically appealing items either. Unfortunately, many common attachment mechanisms simply do not translate well to similar but smaller structures for smaller devices, such as the exemplary personal or portable devices discussed herein.

While many of the devices and techniques used to attach a lanyard or strap to a portable or other low profile device have generally worked well in the past, there is always a desire to provide other devices or techniques that can achieve the same objectives in a reliable fashion that might also be more aesthetically pleasing.

SUMMARY

It is an advantage of the present invention to provide miniaturized connectors that are adapted to readily connect straps or lanyards to portable or other low profile devices in a quick and easy manner. This can be accomplished at least in part through the use of a small pin adapted for insertion into a hole on the portable device, along with a locking mechanism adapted to hold a part of the pin in the hole while inserted therein. The use of such a small pin and hole locking arrangement allows a user to avoid the often times cumbersome or unsightly approach of doubling or even tying the strap or lanyard back onto itself after such an attachment.

In various embodiments, a connector adapted for attaching a strap or lanyard to a portable device can include a pin having a first portion including a first distal end thereof and a second portion located separately from said first portion, a locking mechanism adapted to hold at least part of the first portion within a hole on the portable device when the first portion is inserted therein, and a release mechanism adapted to release the hold on the first portion from the hole when the release mechanism is activated by a user. The first portion of the pin can have a diameter of about 3 millimeters or less, and is preferably adapted for insertion into the hole on the portable device. Further, the second portion can be adapted to be coupled to the strap or lanyard, such that the strap or lanyard can then be readily coupled to the portable device by way of the pin and hole arrangement.

In various embodiments, the locking mechanism can include a spring-loaded component, such as a ball detent, with such a spring-loaded component preferably being located within the first portion of the pin. In some embodiments, due to the small size of the pin and the difficulty in making reliably accurate parts of such small size, the ball detent or other spring-loaded component can be larger than half the outer diameter of the first portion of the pin. In some embodiments, the locking mechanism can also include a force redirection component located within the pin, with such a force redirection component being adapted to accept spring force from a locking spring in a first direction and deliver a corresponding force to the ball detent or other spring-loaded component in a second direction that is not parallel to the first direction. The first direction and second direction can even be substantially perpendicular with respect to each other in some cases. In some embodiments, the release mechanism can be adapted to enable a user to counteract the force of a locking spring on the spring-loaded component.

In various further embodiments, the locking mechanism can include a two-hole receiving component located at the portable device, with such a two-hole receiving component including a first hole adapted to receive the pin and a second hole adapted to operate in conjunction with the release mechanism. In such embodiments, the first portion of the pin can have a diameter of about 1 millimeter or less. Further, such embodiments can involve the first portion of the pin having a groove about its outer circumference near the first distal end, such that the locking mechanism can include a clamp adapted to lock onto the groove when the pin is inserted into the first hole. In such embodiments, the release mechanism can be adapted to release the lock of this clamp on the groove when an object such as a key, pointer or other pin is inserted into the second hole.

As will be readily appreciated, various features from one or more of these embodiments may be incorporated into one or more of the other embodiments. Such connectors may also be termed "miniaturized attachment mechanisms," and various examples of the personal portable device or other low profile device to which an associated strap, lanyard, cord or other similar feature can be attached can include a cellular phone and/or a media player. In various embodiments, the hole for the small pin can be located in a housing of the portable device.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive apparatus and method for providing small lanyard or strap connectors for low profile devices. These drawings in no way limit any changes in form and detail that may be made to the invention by one skilled in the art without departing from the spirit and scope of the invention.

FIG. 6A illustrates in top perspective view an exemplary two hole E-ring mechanism adapted to receive the alternative connector pin of FIG. 5A according to the alternative embodiment of the present invention.

FIG. 6B illustrates in top perspective view the exemplary alternative connector pin of FIG. 5A according to the alternative embodiment of the present invention.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting; such that other embodiments may be used, and changes may be made without departing from the spirit and scope of the invention.

The invention relates in various embodiments to a low profile or small form factor mechanism for securing and releasing straps, cords, bands, charms, lanyards and the like to a small scale implement or key that releasably locks into a low profile hole or keyway on a portable, personal and/or low profile device in order to provide the device with an attached strap, cord, lanyard or the like. Such a device can be, for example, an electronic device, such as an iPod® media player made by Apple Inc., or any other similar media player.

In various embodiments of the present invention, a miniaturized attachment mechanism for attaching a lanyard to a cell phone, media player or other portable or low profile device having a hole in its outer casing is provided. The miniaturized attachment mechanism can have one end permanently fastened or otherwise attached to a lanyard, strap, cord or other object suitable for carrying and/or wearing the portable or low profile device, with the other end being adapted for locking the attachment mechanism to the portable or low profile device. In some embodiments, a locking mechanism can include a spring-loaded ball detent within a hollow shaft. The hollow shaft diameter can be about 3 millimeters or less, while the diameter of the ball within the hollow shaft can be about 2 millimeters or less. The hollow shaft can be inserted into the casing hole such that the ball detent secures the mechanism to the casing until a pin release is used. In further embodiments, the locking mechanism can involve a 1 millimeter shaft having a groove at an insertable end, while the casing encloses a two hole E-ring mechanism adapted to lock onto the groove when the shaft is inserted into the casing hole.

Figure 1A:
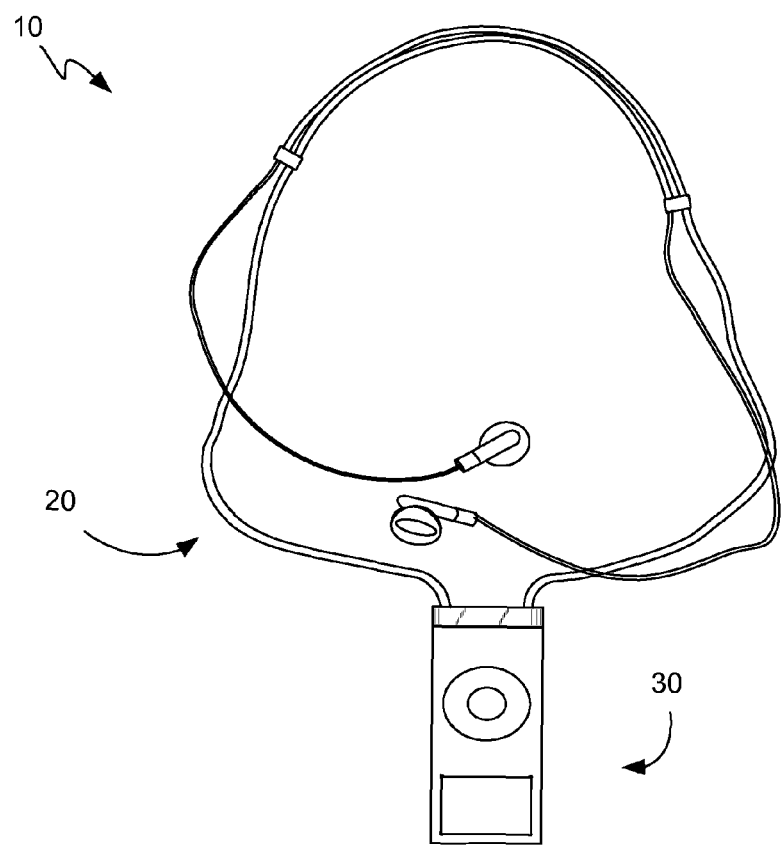
FIG. 1A illustrates in top plan view an exemplary lanyard and associated media player device.
Figure 1B:
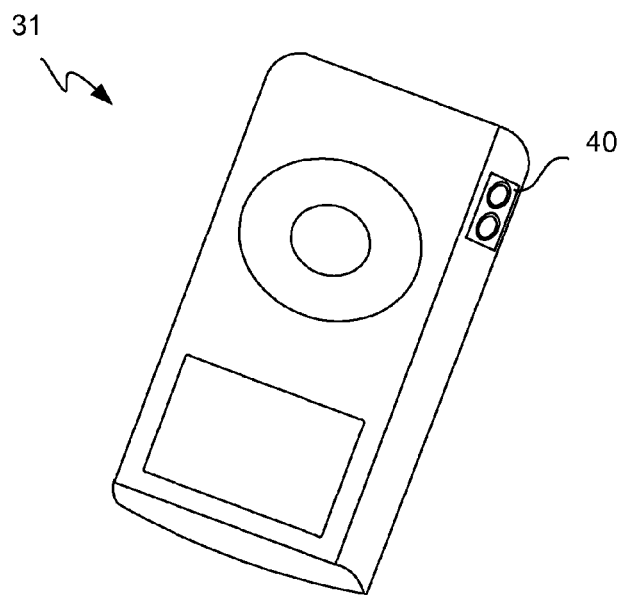
FIG. 1B illustrates in top perspective view an exemplary media player device suitable for use with the present invention.

Referring first to FIG. 1A, an exemplary lanyard and associated media player device is shown in top plan view. Personal device arrangement 10 can include a strap, cord or lanyard 20, which can be coupled to a low profile, portable and/or personal device 30. Such a device 30 can be any of a wide variety of devices, such as, for example, a camera, cellular telephone, or media device, among others. As shown portable personal device 30 can be an iPod® media player. Continuing to FIG. 1B an exemplary media player device suitable for use with the present invention is illustrated in top perspective view. Media player device 31 can be substantially similar to device 30 in the foregoing example. Device 31 includes, among various other features not disclosed in detail herein, one or more holes or ports located in or at connector region 40. Such holes or ports can be formed in the outer casing of media player device 31, and can be provided as part of the manufacturing process of the device. Of course, other suitable locations for such holes or ports and possibilities of modifying an existing low profile device to have such holes or ports can also be used, as will be readily appreciated by those skilled in the art.

Ball Detent

Figure 2A:
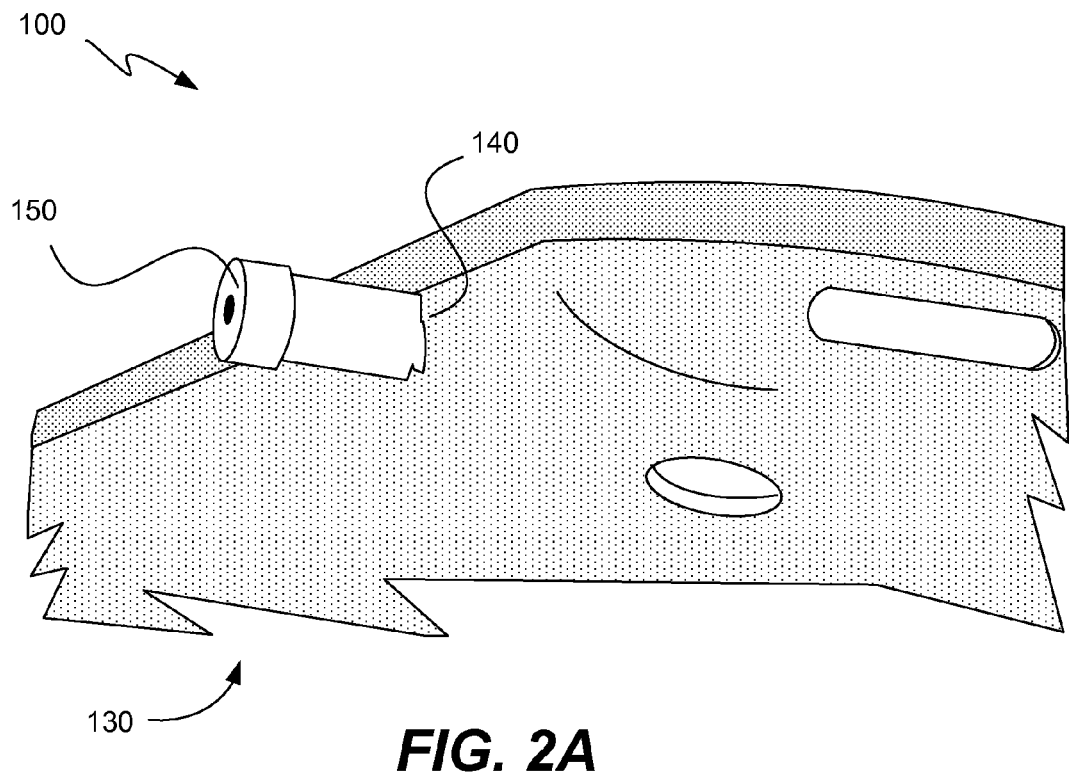
FIG. 2A illustrates in partial bottom perspective view an exemplary media player device having a miniaturized connector pin inserted therein according to one embodiment of the present invention.

Moving next to FIG. 2A, an exemplary media player device having a miniaturized connector pin inserted therein according to one embodiment of the present invention is shown in partial bottom perspective view. Device and connector arrangement 100 can include a media player device or other low profile device 130 having one or more holes at a connector region 140, as well as a connector 150 in the form of a miniaturized pin or post. Although arrangement 100 is suitable for use with a strap, cord, lanyard or other similar item, such items are not shown herein for purposes of simplicity in illustration. As will be readily appreciated, such a strap, cord or lanyard can be permanently or temporarily affixed or attached to pin 150 in a variety of suitable manners, such as by glue, staples, rivets, knots and the like. Preferably, such a strap or lanyard (not shown) can be attached or otherwise coupled to a portion of the pin 150 that is not inserted into the portable device 130, such as those portions of pin 150 that are visible in FIG. 2A.

Figure 2B:
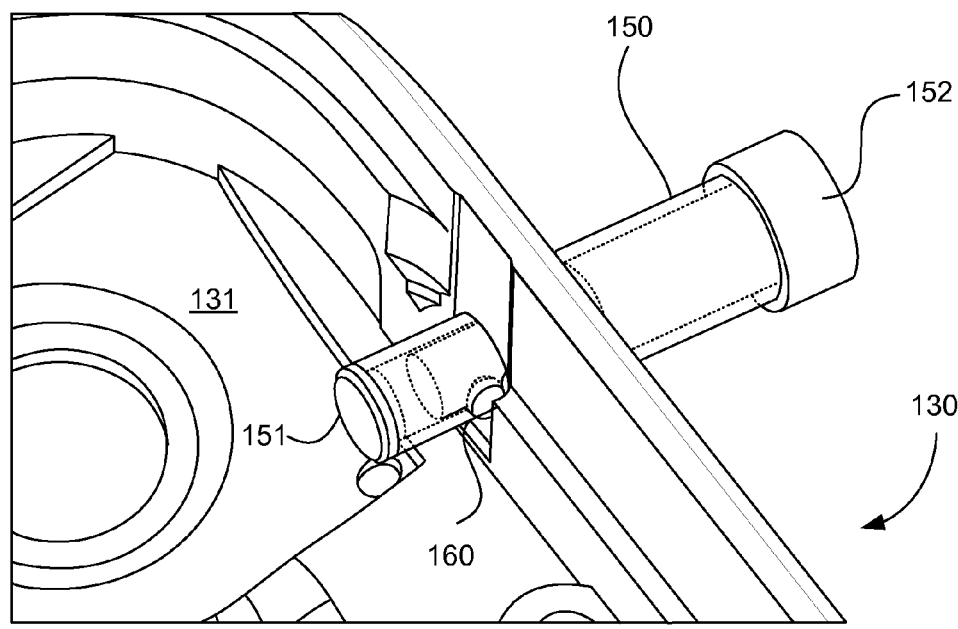
FIG. 2B illustrates in partial top perspective cutaway view the exemplary media device and inserted connector pin of FIG. 2A according to one embodiment of the present invention.

FIG. 2B illustrates in partial top perspective cutaway view the exemplary media device and inserted connector pin of FIG. 2A. Portable device 130 has an outer housing 131 having one or more holes suitable for accepting the miniaturized connector or pin 150. This pin 150 can have a first portion 151 including a first distal end thereof and a second portion 152 located separately from the first portion. In some embodiments, first portion 151 can have a diameter of about 3 millimeters or less, while being adapted for insertion into a first hole on portable device 130. By way of example, the diameter of first portion 151 of pin or connector 150 can range from 0.5 to 3.0 millimeters, and more particularly, can range from 1.5 to 2.5 millimeters. As noted previously, second portion 152 of pin 150 can be adapted to be coupled to an associated strap or lanyard.

Various types of locking mechanisms may be employed so as to hold at least part of first portion 151 of pin 150 within a hole of portable device 130 when the first portion of the pin is inserted therein. A release mechanism may also be adapted to release the hold on first portion 151 from the hole when the release mechanism is activated by a user. As shown in FIG. 2B, a specialized ball detent 160 can be one way of locking pin 150 into the hole in portable device 130 while the pin is inserted therein. Such a specialized ball detent is designed in a particular way, due to the tiny dimensions of the pin 150 and mating hole in this particular application. Again, the diameter of pin 150 is about 3 millimeters or less, such that typical ball detent features and mechanisms are not readily usable in such a small application.

Figure 3A:
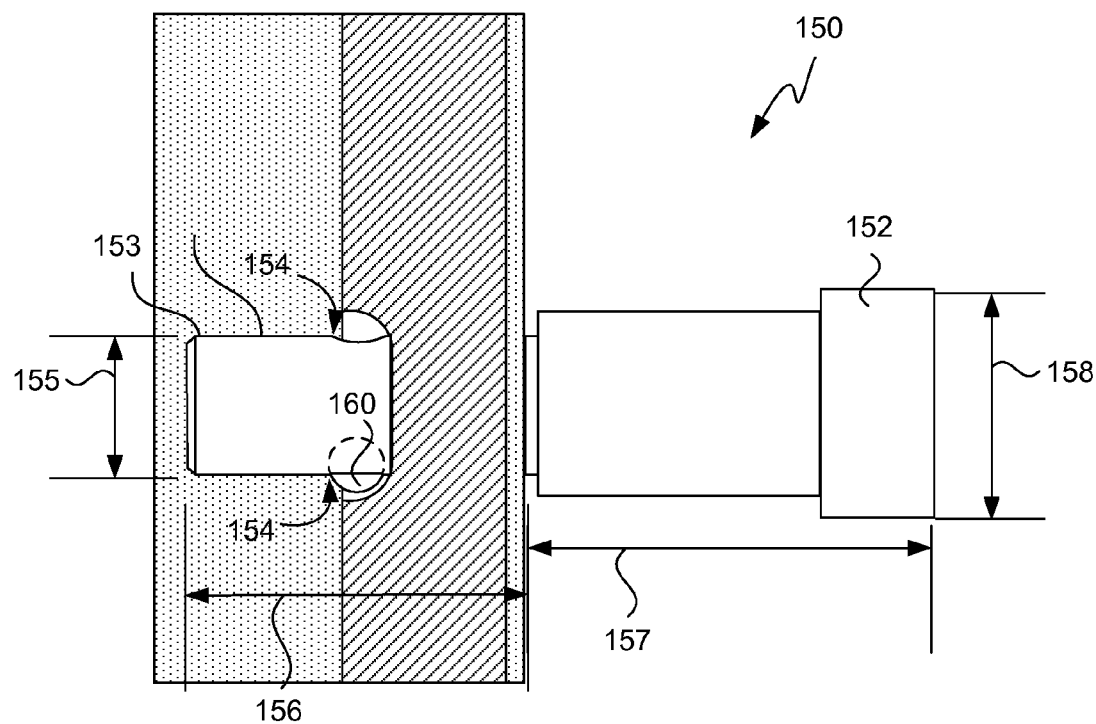
FIG. 3A illustrates in partial side elevation cutaway view the exemplary media device and inserted connector pin of FIG. 2A according to one embodiment of the present invention.

Referencing FIG. 3A next, the exemplary media device and inserted connector pin of FIG. 2A is illustrated in partial side elevation cutaway view according to one embodiment of the present invention. Connector or pin 150 can comprise a hollow shaft adapted to contain a spring loaded ball detent mechanism therein. As noted above, pin 150 can include a first portion 151 that can be inserted into a hole in the portable device, a second portion 152 that can be coupled to a lanyard, a cap or plug 153 at the distal end of first portion 151 so as to provide a cap and/or a physical stop for the components within the hollowed out portion of the pin, and one or more detent holes 154 adapted to operate in conjunction with one or more balls 160 or other spring-loaded components. As shown in FIG. 3A, pin 150 has been inserted into a hole in the portable device such that ball detent 160 has locked the pin in place therein.

Although various dimensions of connector or pin 150 are contemplated, dimensions that are thought to be particularly useful include the diameter 155 of the first portion 151 ranging from about 0.5 to 3.0 millimeters—and more particularly about 2.5 millimeters, the length 156 of first portion 151 being about 6 millimeters, the length of the second portion 152 and remainder of the pin (if applicable) being about 7 millimeters, and the diameter of the end of second portion 152 being about 4 millimeters. As shown, the end of the pin 150, which can include the noted second portion of the pin, can have an extending step or other feature so as to facilitate the coupling of a strap or lanyard thereto.

Figure 3B:
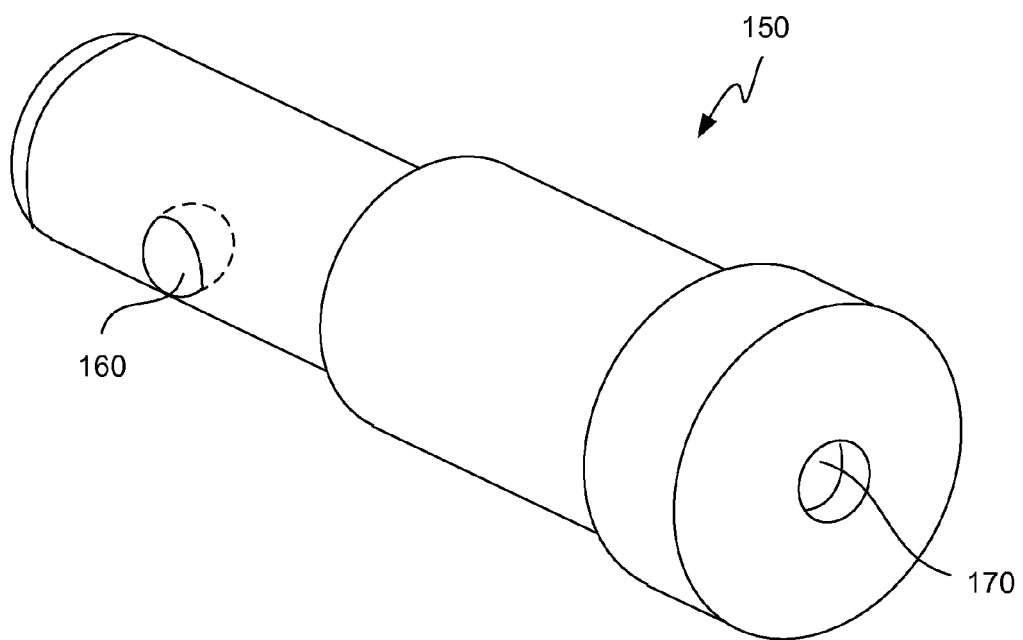
FIG. 3B illustrates in front perspective view the miniaturized connector pin of FIG. 2A according to one embodiment of the present invention.

FIG. 3B shows in front perspective view the miniaturized connector pin of FIG. 2A. Pin 150 includes a ball detent feature 160, as well as a release mechanism that can be activated via relief hole 170 on the outer distal end of the pin. In various embodiments, a key, pin or other foreign object can be inserted into relief hole 170 and pushed inward in order to activate a release mechanism that then allows for an extended ball 160 to be released back into the shaft, such that the entire pin 150 can then be removed from the associated portable or personal device.

Figure 4A:
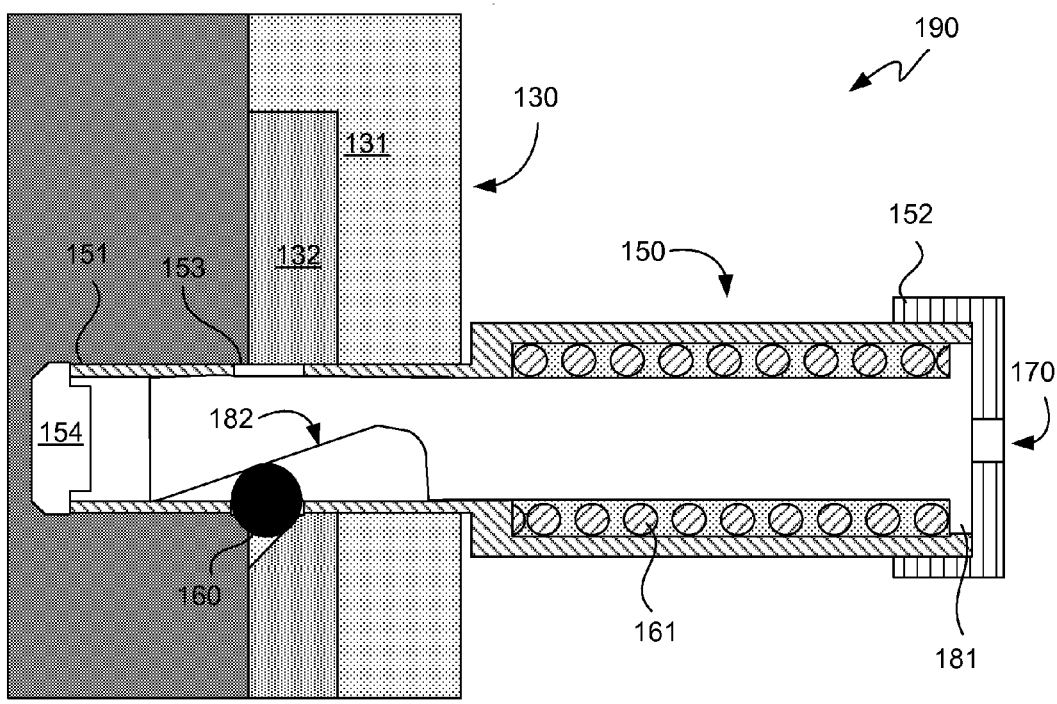
FIG. 4A illustrates in partial side elevation cross-sectional view the exemplary media device and inserted connector pin of FIG. 2A while the pin is in a locked state according to one embodiment of the present invention.
Figure 4B:
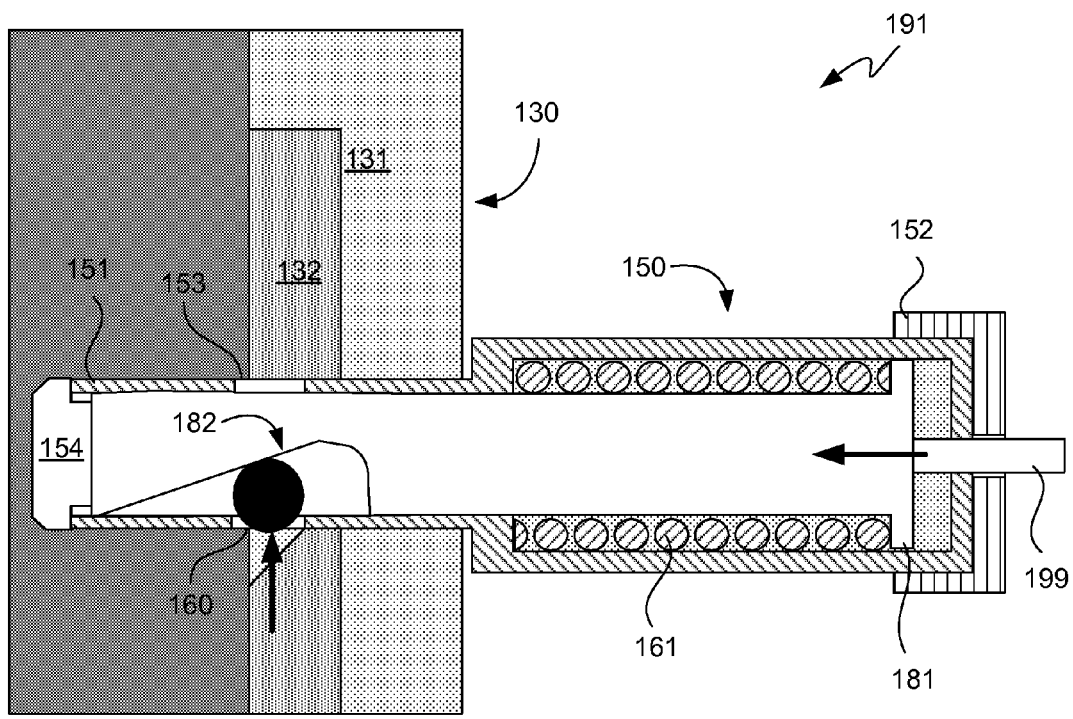
FIG. 4B illustrates in partial side elevation cross-sectional view the exemplary media device and inserted connector pin of FIG. 4A while the pin is in an unlocked state according to one embodiment of the present invention.

Further details of this mechanism can be seen with respect to FIGS. 4A and 4B, which illustrate in partial side elevation cross-sectional view the exemplary media device and inserted connector pin of FIG. 2A while the pin is in a locked state and while the pin is in an unlocked state. FIG. 4A illustrates a locked state, with compression spring 161 providing force sufficient so as to force ball 160 into a respective detent hole 153 and lock the pin 150 in place thereby. As shown, spring 161 provides force upon a force redirection component, such as plunger 180. As the spring pushes against flange 181 of plunger 180, the plunger is pushed toward the second portion 152 and outer distal end of pin 150. Specially formed surface 182 on the plunger then acts to force ball 160 into the detent hole to lock the pin in place.

Second portion 152 can form or include, for example, a cap on the outer distal end of pin 150, such that the spring, plunger, ball and/or any other internal components are retained inside the hollowed out pin. In some embodiments, this cap can be glued, welded, press-fit or otherwise held in place at the outer distal end of pin 150 by any other similarly suitable means. As shown, relief hole 170 can be formed in such a cap or other end section of second portion 152 of the pin. Further, such a cap or other end section can be somewhat larger in diameter than other portion(s) of pin 150 so as to form a "step" or ledge thereby, such that attachment of a strap or lanyard to the second portion can be more readily facilitated.

FIG. 4B illustrates an unlocked state for pin 150. A user can utilize a key, pin or other suitable foreign object 199 and insert such an item into relief hole 170. Such a foreign object 199 then pushes plunger 180 in the direction indicated by the force arrow contacting object 199 so as to compress spring 161, which thereby releases ball 160 from its respective detent hole 153. The result is an unlocked position for pin 150. Although only one ball 160 and detent hole 153 is shown, it will be readily appreciated that multiple balls and detent holes may be used. Also, it may not be necessary to provide any extra spring force or other biasing force on ball 160 to arrive at the illustrated unlocked position, as a simple attempt to pull pin 150 out of the hole in media device 130 would then result in the housing of the media device pushing against the ball such that the ball would generally move in the direction indicated by the force arrow contacting ball 160.

Unlike various larger scale prior art ball detent arrangements, the arrangement shown in FIGS. 4A and 4B involves the use of a force redirection component, such as in the form of plunger 180. Such a plunger or force redirection component allows for spring force to be delivered in one direction, with a resulting force to a ball detent or other similar component to be in another non-parallel direction. In fact, the force directions of the spring and the resulting force seen by the ball or other detent component can be substantially perpendicular to each other, as shown. In addition, due to the miniaturized scale of the ball detent mechanism of the present invention, the actual ball or other detent component is quite large relative to the size of the shaft that it is in. Unlike various larger scale prior art ball detent arrangements, the miniaturized ball detent mechanism of the present invention can includes a ball or other spring loaded component having a diameter that is up to or even larger than half the outer diameter of the shaft or pin within which it resides. For example, the diameter of ball 160 may range from about 0.3 to 1.6 millimeters, depending upon the actual diameter of first portion 151. Of course, smaller and larger dimensions are also possible, and it is also possible for ball 160 to have a diameter that is somewhat smaller than half the diameter of first portion 151.

Two Hole E-Ring

Figure 5A:
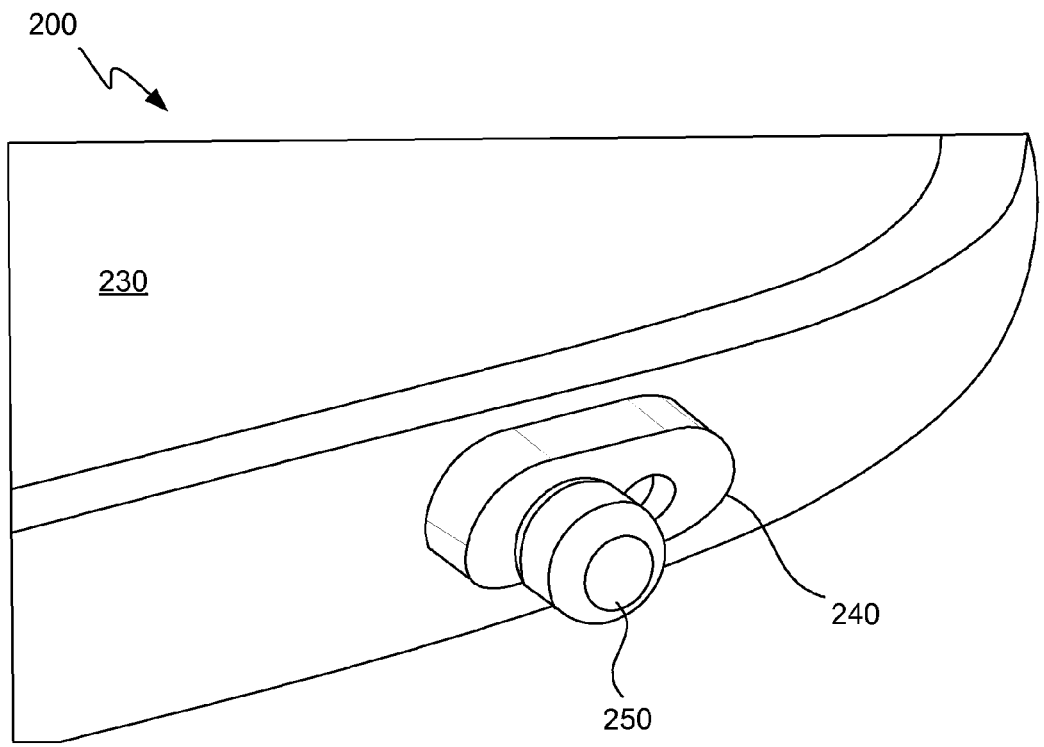
FIG. 5A illustrates in partial top perspective view an exemplary media player device having an alternative miniaturized connector pin inserted therein according to an alternative embodiment of the present invention.

Turning next to FIG. 5A an exemplary media player device having an alternative miniaturized connector pin inserted therein according to an alternative embodiment of the present invention is illustrated in partial top perspective view. Device and connector arrangement 200 can include a media player device or other low profile device 230 having a plurality of holes at a connector region 240, as well as a connector 250 in the form of a miniaturized pin or post. As in the foregoing embodiment, although arrangement 200 is suitable for use with a strap, cord, lanyard or other similar item, such items are not shown herein for purposes of simplicity in illustration. As will be readily appreciated, such a strap, cord or lanyard can be permanently or temporarily affixed or attached to pin 250 in a variety of suitable manners, such as by glue, staples, rivets, knots and the like. Preferably, such a strap or lanyard (not shown) can be attached or otherwise coupled to a portion of the pin 250 that is not inserted into the portable device 230, such as those portions of pin 250 that are visible in FIG. 5A.

Figure 5B:
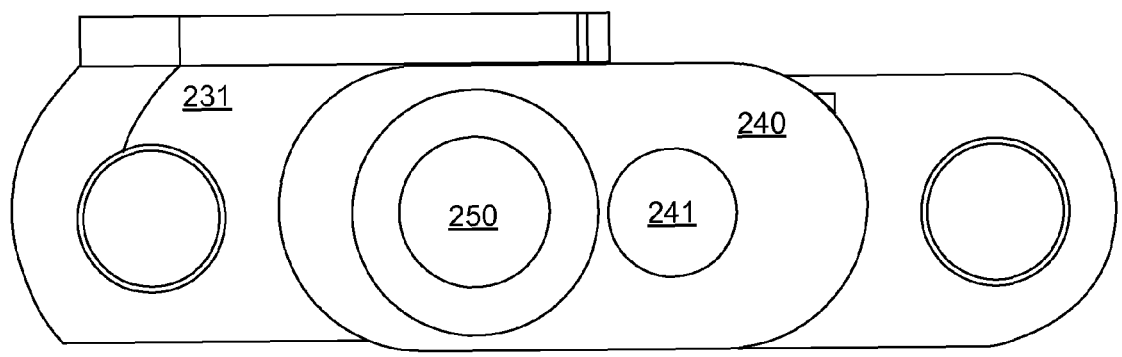
FIG. 5B illustrates in partial side plan view the exemplary media device and inserted alternative connector pin of FIG. 5A according to the alternative embodiment of the present invention.

FIG. 5B illustrates in partial side plan view the exemplary media device and inserted alternative connector pin of FIG. 5A according to the alternative embodiment of the present invention. As shown, connector region 240 is disposed about the outer housing or casing 231 of the media device. Pin 250 is inserted into a first hole on connector region 240, while a second hole 241 remains open. The first hole holding pin 250 is designed to lock the pin in place while the pin is inserted therein, while the second hole 241 serves as a relief hole that allows a user access to a release mechanism that can then unlock the pin from its hold in the first hole.

FIGS. 6A and 6B illustrate in top perspective view an exemplary two hole E-ring mechanism adapted to receive the alternative connector pin of FIG. 5A, and also the exemplary alternative connector pin of FIG. 5A itself. As shown in FIG. 6A, connector region 240 essentially comprises a two hole E-ring type mechanism, having a first hole 242 adapted to receive and lock in place a suitably adapted connector pin, and a second hole 241 adapted to facilitate the release of a lock or hold on the pin inserted into the first hole, such as when a key, pin or other suitable foreign object is appropriately inserted into second hole 241. As shown in FIG. 6B, alternative connector pin 250 includes a first portion 251 having a groove 253 near a first distal end thereof, as well as a larger diameter second portion 252. In various embodiments, the diameter 255 of first portion 251 of pin 250 can be about 1.0 millimeters, while the diameter 256 of second portion 252 can be about 2.5 millimeters. Further, the overall length 257 of pin 250 can be about 5.0 millimeters. Of course, other dimensions for these items are also possible, although these particular dimensions are known to work well for the purposes provided herein.

Figure 6C:
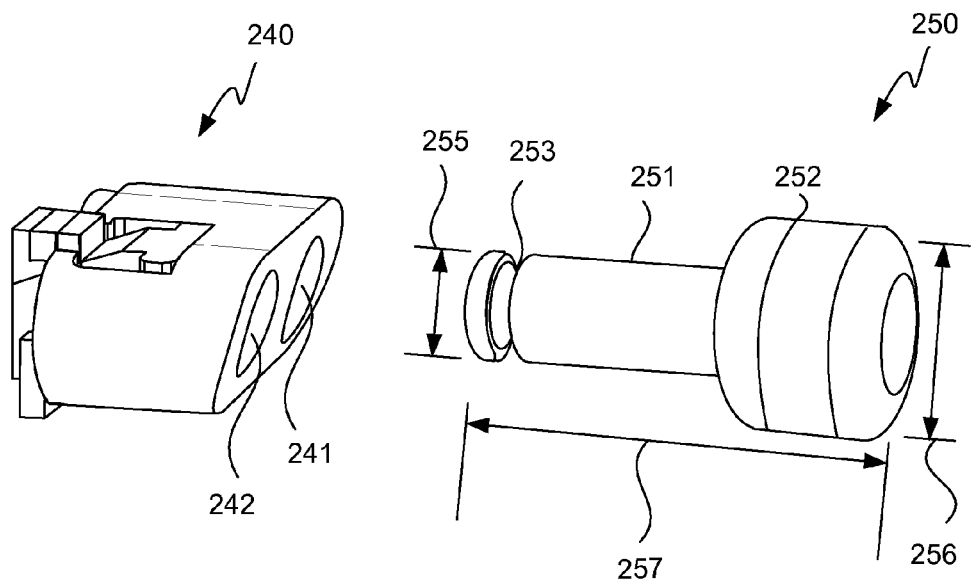
FIG. 6C illustrates in top plan view the exemplary alternative connector pin of FIG. 6B inserted into the exemplary two hole E-ring mechanism of FIG. 6A according to the alternative embodiment of the present invention.
Figure 6C:
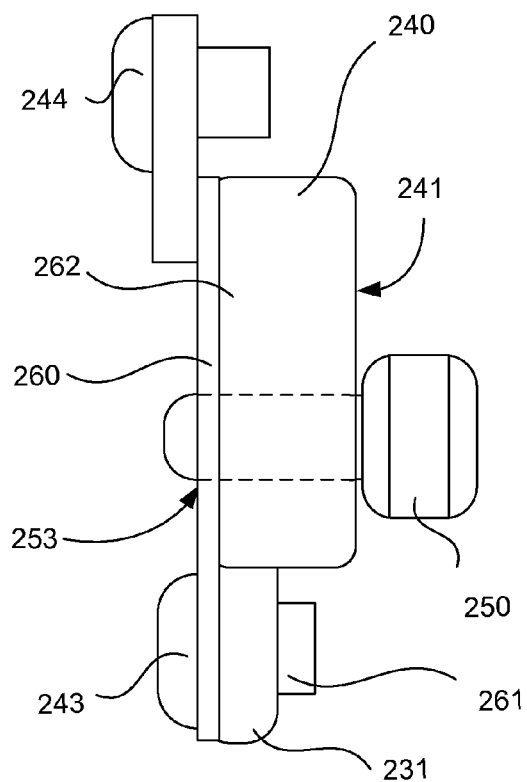

Continuing on to FIG. 6C, a top plan view is provided of the exemplary alternative connector pin of FIG. 6B being inserted into the exemplary two hole E-ring mechanism of FIG. 6A. Pin 250 has been inserted into the first hole of two hole E-ring mechanism 240, with the second hole 241 remaining open. Fasteners 243, 244 hold the two hole E-ring mechanism or connector region 240 to the media device housing or casing 231, and such fasteners can be screws, nails, rivets, buttons or any other suitable fastening components. An internal lever or clamp 260 locks onto the groove 253 of pin 250 once the pin is inserted into the first hole, such that the pin is locked in place thereby. Such a clamp 260 can be acted upon by a suitable biasing component, such as a torsional spring 261 formed as part of a connector 243. One or more clamp release components 262 can then be used in conjunction with second hole 241 such that a release on the clamp locking of the pin can be effected.

Figure 7A:
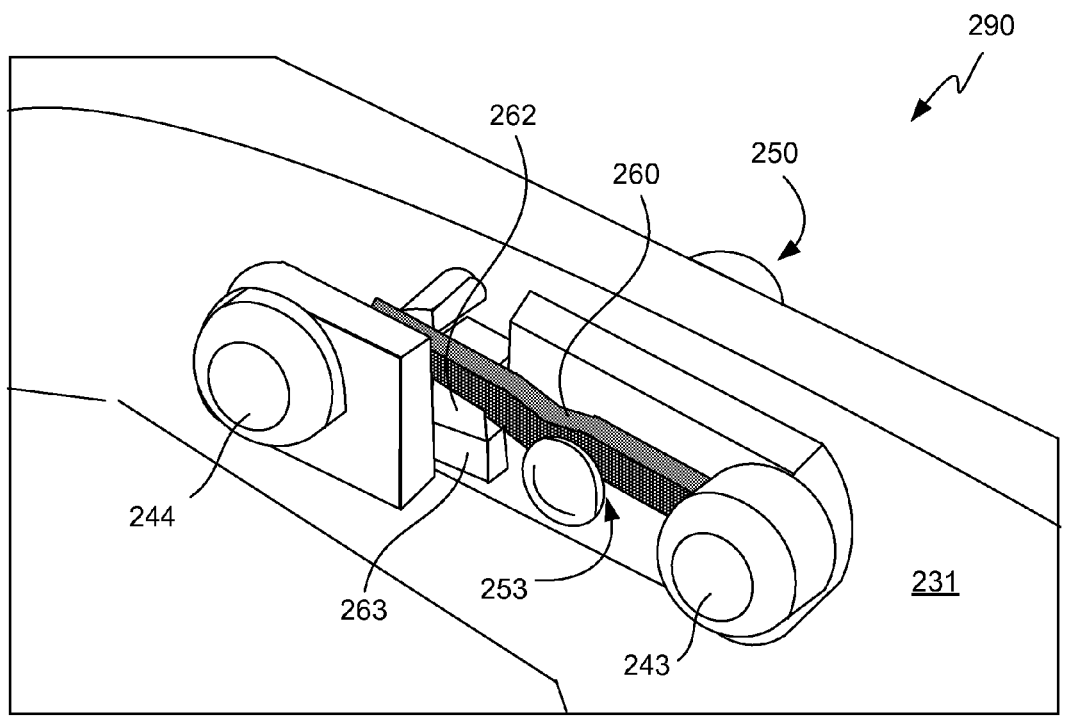
FIG. 7A illustrates in partial top perspective cutaway view the exemplary media device and inserted alternative connector pin of FIG. 5A while the pin is in a locked state according to the alternative embodiment of the present invention.
Figure 7B:
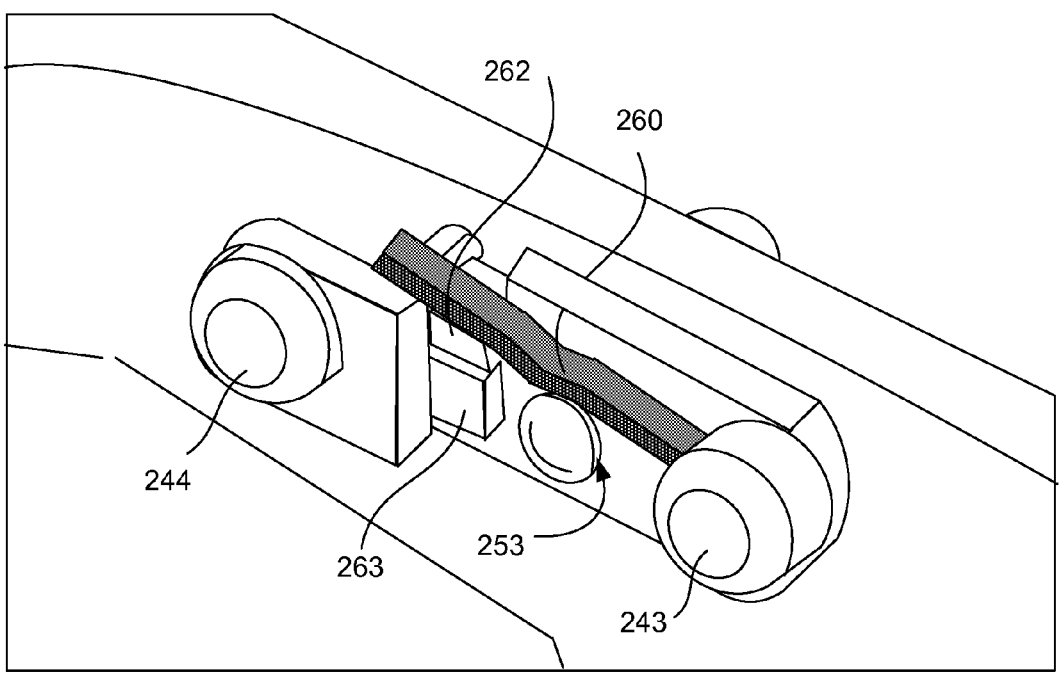
FIG. 7B illustrates in partial top perspective cutaway view the exemplary media device and inserted alternative connector pin of FIG. 7A while the pin is in an unlocked state according to the alternative embodiment of the present invention.

Further details of these pin locking and releasing mechanisms can be seen with respect to FIGS. 7A and 7B, which illustrate in partial top perspective cutaway views the exemplary media device and inserted alternative connector pin of FIG. 5A while the pin is in a locked state and while the pin is in an unlocked state. FIG. 7A illustrates a locked state, with the torsional spring associated with fastener 243 providing rotational force onto clamp 260 in a counter-clockwise direction so as to lock the clamp into the groove 253 of inserted pin 250. The pin 250 is thereby locked in place, and is not easily removable until the clamp 260 is released from groove 253.

FIG. 7B illustrates the arrangement in an unlocked state. Here, the lever or clamp 260 has been lifted off of the groove 253 despite the biasing force of the torsional spring inside or otherwise associated with fastener 243. Such a lifting motion of clamp 260 can be effected by way of inserting a key, pin or other suitable foreign object in the second hole on the outside of the two hole device. Such use can result in the pushing backward of release item 263, which in turn can result in the pushing upward of release component 262. Such an arrangement can be the result of appropriately designed tracks and tapers in moving and mating components, as will be readily appreciated by those skilled in the art. The resulting rise or lift in release component 263 can then effect a resulting lift in the clamp 260 so that the clamp is then lifted out of the groove 253, and the pin is thereby removable from the first hole.

The use of a pin locking and release arrangement having pin dimensions on the order of only about 1.0 millimeters is substantially miniaturized over the much larger dimensions of similar pin locking arrangements. Accordingly, the use of such small pins and holes and the resulting design differences are unique, particularly with respect to the provided applications involving the connection of a strap or lanyard to a portable personal device or other low profile device.

As will be readily appreciated, in some of the foregoing embodiments, the hole for receiving the post or connector pin can be integrated with an audio and/or video jack on an associated electronic device. The hole can be configured to be inserted in place of a jack. It can also be configured to be inserted along with a separate jack. By using the same hole or arrangement for an audio and/or video jack and also a lock for a strap, lanyard or other similar item, the impact on the overall device and connector dimensions can be thereby reduced.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

What is claimed is:

1. A personal portable device, comprising:
   an electronic processing component adapted to provide processing for a user thereof;
   an outer housing containing said electronic processing component and having a first hole located thereon, wherein said first hole comprises a jack adapted for providing a media output from said personal portable device;
   a strap or lanyard adapted to be detachably coupled to said outer housing; and
   a miniaturized attachment mechanism coupled to said strap or lanyard, said miniaturized attachment mechanism having
   a pin having a first portion including a first distal end thereof and a second portion located separately from said first portion, wherein said first portion has a diameter of about 1 millimeter or less, includes a groove about its outer circumference near said first distal end, and is adapted for insertion into said first hole on said personal portable device, and wherein said second portion is coupled to said strap or lanyard,
   a locking mechanism adapted to hold at least part of said first portion within said first hole of said portable device when said first portion is inserted therein, wherein said locking mechanism includes a two-hole receiving component located at said portable device, said two-hole receiving component including said first hole adapted to receive said pin and a second hole, and
   a release mechanism adapted to operate in conjunction with said second hole to release the hold on said first portion from said first hole when said release mechanism is activated by a user.

2. The personal portable device of claim 1, wherein said personal portable device comprises a cellular telephone or a media player.

3. The personal portable device of claim 1, wherein said locking mechanism includes a clamp adapted to lock onto said groove when said pin is inserted into said first hole, and wherein said release mechanism is adapted to release the lock of said clamp on said groove when an object is inserted into said second hole.

4. The personal portable device of claim 1, wherein said media output from said personal portable device is provided via said miniaturized attachment mechanism.

5. The personal portable device of claim 4, further comprising:
   one or more speakers coupled to said miniaturized attachment mechanism and adapted to provide audio output for the user of the device based on said media output.

6. The personal portable device of claim 5, wherein said or more speakers comprise one or more earbuds for the user of the device.

7. A lanyard connecting system for a small profile electronic device, comprising:
   a lanyard adapted to be worn by a user of a small profile electronic device, said lanyard being adapted to support the weight of itself and the small profile electronic device when said lanyard is coupled thereto and both are worn by the user;
   a connecting pin having a first portion including a first distal end thereof and a second portion located at an opposing end of said connecting pin from said first portion, wherein said first portion has a diameter of about 1 millimeter or less, includes a groove about its outer circumference near said first distal end, and is adapted for insertion into a first hole located on a housing of the small profile electronic device, and wherein said second portion is coupled to said lanyard;
   a locking mechanism adapted to hold at least part of said first portion within the first hole of the small profile electronic device when said first portion is inserted therein, said locking mechanism including a two-hole receiving component located at the small profile electronic device, said two-hole receiving component including said first hole adapted to receive said pin and a second hole and
   a release mechanism adapted to operate in conjunction with said second hole to release the hold on said first portion from the first hole when said release mechanism is activated by the user, whereby said connecting pin and lanyard may be decoupled from the small profile device thereby.

8. The lanyard connecting system of claim 7, wherein said hole comprises a jack adapted for providing a media output from said small profile electronic device, and wherein said connecting pin is adapted to transmit media output therethrough to an associated media playing component.

9. The lanyard connecting system of claim 8, further including:
   one or more speakers coupled to said connecting pin and adapted to provide audio output for the user of the device based on said media output.

10. The lanyard connecting system of claim 9, wherein said or more speakers comprise one or more earbuds for the user of the device.

11. A system for wearing a consumer electronic product, comprising:
    a portable electronic device including an electronic processing component adapted to provide media processing and a two-hole receiving component including a first hole adapted for securing a male insertion member of an attachment mechanism therein, a release mechanism adapted to release the male insertion member, and a second hole that operates in conjunction with the release mechanism; and
    a wearable feature for helping facilitate the wearing of the portable electronic device on a user, the wearable feature adapted to be detachably coupled to the portable electronic device, the wearable feature having the attachment mechanism including the male insertion member, wherein the male insertion member has a diameter of about 1 millimeter or less and includes a groove about its outer circumference near its inserted end.

12. The system of claim 11, wherein said first hole comprises a media jack adapted for providing a media output from said portable media device and wherein said attachment mechanism is adapted to transmit said media output therethrough.

13. The system of claim 12, wherein said media output comprises an audio output that is provided to the user of the device.

14. The lanyard connecting system of claim 8, further including:

one or more earbuds coupled to said attachment mechanism and adapted to provide audio output for the user of the device based on said media output.

* * * * *